(12) United States Patent
Rachapudi et al.

(10) Patent No.: US 10,646,732 B2
(45) Date of Patent: May 12, 2020

(54) TESTING A MASK SEAL

(71) Applicant: Honeywell International Inc., Morristown, NJ (US)

(72) Inventors: Lakshmi Sailaja Rachapudi, Attleboro, MA (US); Christopher S. Larsen, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 147 days.

(21) Appl. No.: 14/839,316

(22) Filed: Aug. 28, 2015

(65) Prior Publication Data

US 2016/0166859 A1   Jun. 16, 2016

Related U.S. Application Data

(60) Provisional application No. 62/091,355, filed on Dec. 12, 2014.

(51) Int. Cl.
| | | |
|---|---|---|
| A62B 27/00 | (2006.01) | |
| G01M 3/32 | (2006.01) | |
| A62B 18/02 | (2006.01) | |
| A62B 9/00 | (2006.01) | |

(52) U.S. Cl.
CPC .............. *A62B 27/00* (2013.01); *A62B 9/006* (2013.01); *A62B 18/02* (2013.01); *G01M 3/3218* (2013.01); *G01M 3/3263* (2013.01)

(58) Field of Classification Search
CPC ......... A62B 27/00; A62B 9/006; A62B 18/02; G01M 3/3218; G01M 3/3263
See application file for complete search history.

(56) References Cited

U.S. PATENT DOCUMENTS

| | | | | |
|---|---|---|---|---|
| 4,846,166 A | * | 7/1989 | Willeke | A62B 27/00 128/200.24 |
| 2002/0014240 A1 | * | 2/2002 | Truschel | A61M 16/0051 128/204.22 |
| 2004/0173005 A1 | * | 9/2004 | Martone | G01M 3/3236 73/40 |
| 2005/0263155 A1 | * | 12/2005 | Gossweiler | A62B 9/006 128/205.23 |
| 2010/0206051 A1 | * | 8/2010 | Mahoney | G01M 3/3263 73/40 |
| 2011/0277759 A1 | * | 11/2011 | Crutchfield | A62B 27/00 128/202.22 |

FOREIGN PATENT DOCUMENTS

| | | |
|---|---|---|
| CN | 101393066 A | 3/2009 |
| CN | 202013269 U | 10/2011 |
| CN | 103100156 A | 5/2013 |
| CN | 203750060 U | 8/2014 |

OTHER PUBLICATIONS

Office Action from related China Patent Application No. 201510915439.1, dated Dec. 20, 2018, 20 pages.

* cited by examiner

*Primary Examiner* — David Z Huang
(74) *Attorney, Agent, or Firm* — Alston & Bird LLP

(57) ABSTRACT

A mask seal test method, device, and system of using the same are described herein. One method for testing a mask seal can include blocking a respirator cartridge to create pressure within a mask, wherein the mask includes a pressure sensor, measuring pressure values within the mask using the pressure sensor, and notifying a user in response to an increased pressure decay value among the pressure values received by the mask identification reader.

11 Claims, 4 Drawing Sheets

TESTING A MASK SEAL

TECHNICAL FIELD

The present disclosure relates to testing a mask seal method, devices, and systems of using the same.

BACKGROUND

Mask seals can be checked to identify leaks within a user's mask. Testing a mask can be done in different types of masks, such as air purifying masks, including underwater masks and gas masks, among others.

Previous approaches for testing a mask seal have included a user sealing the mask intake ports and/or cartridges by placing a hand over each cartridge and inhaling. A well-sealed mask will pull against a wearer's face. However, this form of manual mask testing may not detect slow leaks within the mask, resulting in possible user exposure to the environment.

Previous approaches may additionally inhibit and/or prevent safety personnel from tracking test mask seal results among the users (e.g., wearers). This can result in frequent known and/or unknown misuse or non-use among the users, which may, among other issues, expose the users to harmful substances, chemicals, and/or safety concerns. Without accurate pressure sensing, testing a mask seal may be difficult under such approaches.

DETAILED DESCRIPTION

Testing a mask seal using a sensor device and methods and systems of using the same are described herein. For example, one or more embodiments includes blocking an inlet of a mask to create a pressure difference between the air within a respirator mask and the air outside the mask (i.e., a vacuum), wherein the mask includes a pressure sensor, measuring pressure values within the mask using the pressure sensor, associating the mask to an mask identification reader to receive the pressure values from the pressure sensor, and notifying a user in response to an increased vacuum decay value among the pressure values received by the mask identification reader.

Testing a mask seal in accordance with embodiments of the present disclosure can test a seal between a mask and a user. As a result, various leaks within the mask can be detected.

A leak, as used herein, generally refers to gas or a substance entering the mask in an unintended manner. Examples of a leak in accordance with embodiments of the present disclosure include air, smoke, water, debris, chemicals, as well as mixtures of these and other gas/substance forms.

While previous approaches for testing a mask seal use manual qualitative means to test a mask seal upon a user's face, embodiments of the present disclosure can quantitatively test a mask seal using a manufactured sensor. For example, a pressure sensor can provide an increased accuracy reading related to the mask seal, the reading(s) can be tracked and/or recorded for record keeping purposes, and/or to monitor safety compliance among users, among other benefits.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of pressure sensors" can refer to one or more pressure sensors.

Figure 1:
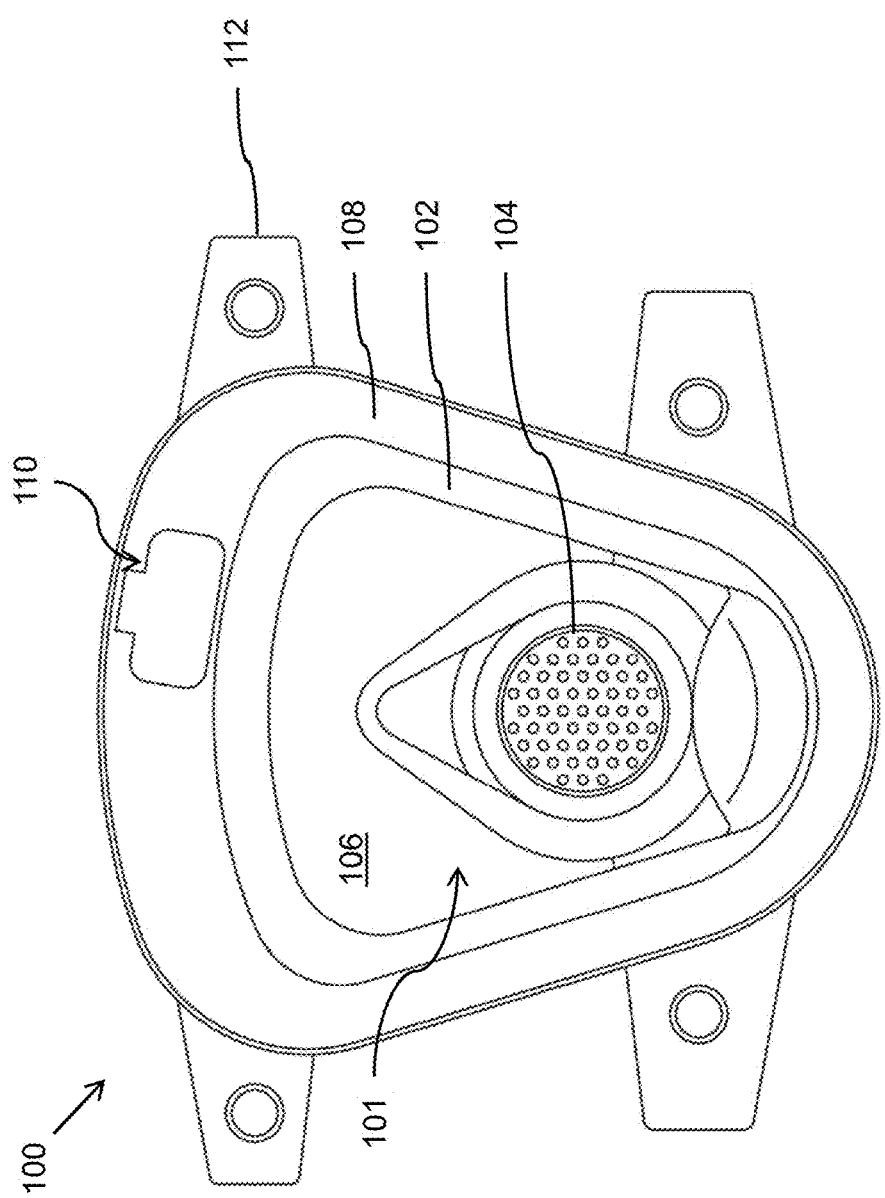
FIG. 1 illustrates a mask according to an embodiment of the present disclosure.

FIG. 1 illustrates a mask 100 according to an example embodiment. The mask 100 can, for example, be a self-contained breathing apparatus (SCBA) mask or respirator mask.

The mask 100 has a mask body which can, for example, include a substantially transparent visor 106 held in an air-tight fashion by a frame 102. Straps 112 can be fixed to the frame 102 and can, for example, be wrapped around the head of a wearer to hold the mask 100 in place.

The mask body also includes a gas housing portion 101 that maintains a gas supply in proximity to at least one of a wearer's nose and mouth. The gas housing portion 101 has a gas conduit 104 connected thereto that allows the wearer to breathe through the mask body when placed on the head of the wearer.

A gas conduit 104 in the frame 102 allows the wearer to breathe through the mask 100. The conduit 104 may include one or more filters to filter incoming gas or may be attached to receive gas from a source of gas such as air or oxygen (not shown).

In the embodiment of FIG. 1, the mask 100 has a skirt 108 attached to the frame 102 in an air-tight manner. The skirt 108 can be flexible and can be attached to the frame 102 along the entire perimeter of the frame 102 and the visor 106. The skirt 108 may form a substantially air-tight seal with the face and forehead of the wearer which is important to prevent toxins from leaking into the space inside the mask 100, for example, between the visor 106 and the wearer. This substantially air-tight area can be defined as gas housing portion 101.

Figure 3:
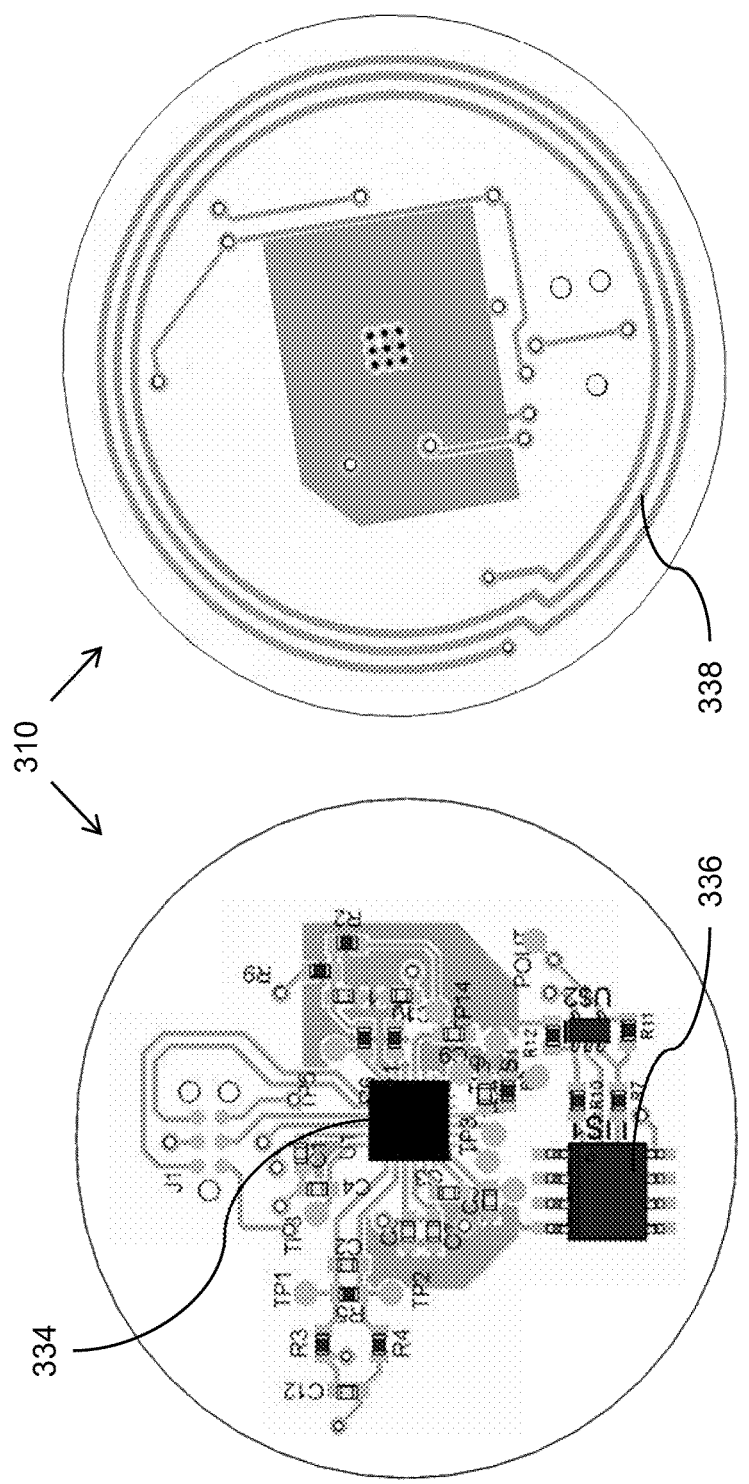
FIG. 3 illustrates a front and back side of a mask seal sensor structure according to an embodiment of the present disclosure.

The body of the mask includes a sensor area 110 for placement of a pressure sensor therein that can sense the pressure within the mask when a vacuum is induced in the mask. In this example, the sensor area 110 is positioned at the skirt 108 of the mask, but the sensor area can be at any suitable location on the mask body where the sensor can measure the pressure within the mask. Additionally, the sensor area can have a sensor mounted on or in the body, a sensor embedded within the body, or attached to the body (e.g., by an adhesive material or other attachment mechanism). As previously discussed, a mask can use a sensor to measure pressure values within the mask. The sensor can, in some embodiments, be provided by a circuit (e.g., a rigid or flexible circuit, such as an integrated circuit), such as is depicted in FIG. 3.

In some embodiments, a pressure sensor can be combined to include a radio frequency identification (RFID) Integrated Circuit (IC) as a mask identifier. The mask identifier provides a unique identifier that can be used, for example, to track (e.g., via a computing system with a database) the condition of the mask over time, among other functions. The identifier can be numeric, alphanumeric, identified by one or more symbols, or other suitable identification mechanisms that can allow one mask to be distinguished from another. This information can be used to, for example, track the dates on which a particular mask has been tested for leaks, the leakage values on those dates, the owner of the mask, and other useful information about the mask, as will be discussed in more detail herein.

As discussed above, the sensor can be mounted within the mask such that the sensor may assess the air pressure changes (e.g., vacuum decay) inside the mask. In some embodiments, the sensor can be molded within the body of the mask (e.g., on or near an inside surface of the mask). For example, the sensor can be molded into the plastic used to mold the body. In some embodiments, the sensor can be applied as a sticker to an inside surface of the mask.

Some sensors that could be used to measure pressure can be cost efficient and/or durable, which in some instances, may sustain the entire life of the mask. For example, by being able to quantify the efficacy of the seal of the mask, a user can be able to know when the mask has become ineffective, which may be much longer than the user may think.

In some embodiments, the sensors do not need to be active at all times, but only when pressure testing takes place. as such, these types of sensors can be low power sensors that can, for example, be provided internal to a mask, which can harvest power from a power source (e.g., a battery or other available power source) and provide a pressure output to the user (e.g., wearer) or remote device, such as a reader or computing device, either through a wireless or wired connection.

In a wired connection, the mask can include a communication component (e.g., transceiver having a wired connection port) to allow communication to and/or from one or both of a computing device and/or reader. In a wireless connection, the mask can include a communication component (e.g., wireless transceiver) to allow communication to and/or from one or both of a computing device and/or reader.

Figure 2:
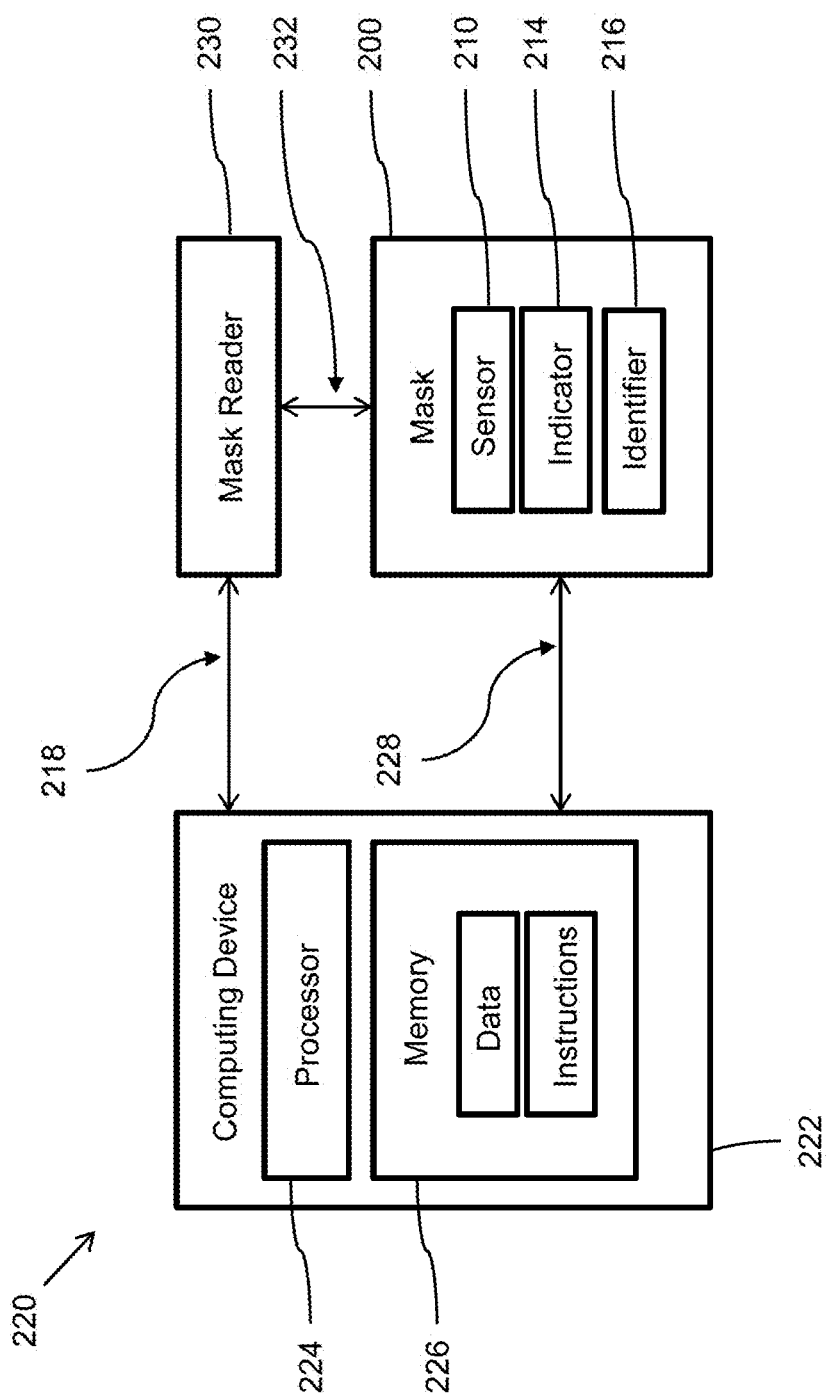
FIG. 2 illustrates a mask seal testing system according to an embodiment of the present disclosure.

FIG. 2 illustrates a mask seal testing system according to an embodiment of the present disclosure. The mask sealing system 220 in the embodiment of FIG. 2 includes a mask 200, a computing device 222, and a mask reader 230.

The mask 200 can be a mask similar to that shown in FIG. 1, but could also be another suitable type of mask that would benefit from the seal testing techniques discussed herein. Further, although the computing device is shown as a different device to the mask reader and the mask, in some embodiments, the mask and/or the mask reader can include a computing device and can accomplish the functionalities of the computing device described herein without use of a separate computing device.

The computing device 222 can include a processor 224 and memory 226. The memory 226 can have various types of information including data and executable instructions, as discussed herein.

The processor 224 can execute instructions that are stored on an internal or external non-transitory computer device readable medium (CRM). A non-transitory CRM, as used herein, can include volatile and/or non-volatile memory.

Volatile memory can include memory that depends upon power to store information, such as various types of dynamic random access memory (DRAM), among others. Non-volatile memory can include memory that does not depend upon power to store information.

Memory 226 and/or the processor 224 may be located on the computing device 222 or off of the computing device 222, in some embodiments. In some embodiments, the computing device 222 can include a network interface. Such an interface can allow for processing executable instructions and/or data on another networked computing device, can be used to obtain information about the masks, users, or other useful information (e.g., from the manufacturer, building site where masks are being used, etc.), and/or can be used to obtain data and/or executable instructions for use with various embodiments provided herein.

As discussed above, the computing device 222 can include one or more input and/or output interfaces (e.g., connection to the transceiver). Such interfaces can be used to connect the computing device 222 with one or more input and/or output devices (e.g., mask 200 and/or mask reader 230, via communication links 218 and/or 228).

Other interfaces can include a display device (e.g., a monitor) and/or a printer, among other suitable devices. The input/output interfaces can receive executable instructions and/or data, storable in the data storage device (e.g., memory), representing information about the mask, the user, the environment in which the mask is being used, etc.

The processor 224 can execute instructions to provide information to a user of the computing device, such as mask identification and ownership information, projected life span of the mask, amount of leakage, comparison of multiple masks, and/or historical and/or predictive information based on the mask data received from the sensor 210.

Such connectivity can allow for the input and/or output of data and/or instructions among other types of information. Some embodiments may be distributed among various computing devices within one or more networks.

As discussed herein, embodiments of the present disclosure can test a mask seal using pressure sensors. The pressure sensors can detect the vacuum decay within the mask, which can determine whether a seal is within a safety threshold. Utilization of the pressure sensors can provide accuracy when testing a mask seal and/or tracking the test results.

The embodiment of FIG. 2 also includes a mask reader 230. The mask reader can be used, for example, to interrogate the mask 200 (via communication link 232) to determine a mask identifier 216, receive information about the status of the mask from an indicator 214 (e.g., a computing device that receives sensor data and determines the status of the mask seal), and/or sensor information that can be used by executable instructions to provide analysis and other information such as: ownership information, projected life span of the mask, amount of leakage, comparison of multiple masks, and/or historical and/or predictive information based on the mask data received from the sensor 210. The mask reader can, for example, be a portable device or a desktop or mounted device that can be used to communicate information and, in some cases, power with the sensor as will be discussed in more detail below.

In some embodiments, a system for testing a breathing mask seal can, for example, include a mask having a gas housing portion that maintains a gas supply in proximity to at least one of a wearer's nose and mouth. The gas housing portion can include a gas conduit connected thereto that allows the wearer to breathe through the mask body when placed on the head of the wearer. The mask also includes a sensor for measuring the pressure within the gas housing portion over time to determine if leakage from the mask body is below a threshold.

The system also includes a leakage rate computing device that receives data from the sensor and evaluates the data to determine if leakage from the mask is below a threshold. The leakage rate computing device can, for example, be on or embedded in the mask or can be in communication with the mask, such as a reader or remote computing device (e.g., computing device 222 or reader 230) as discussed herein.

The received data can, for example, include a sensed pressure at a first point in time with a sensed pressure at a second point in time and the first and second data points are compared to determine a leakage rate and the leakage rate is compared to a threshold leakage rate. In some embodiments, the first and second data points can be compared to determine a leakage rate and the leakage rate is compared to at least one other leakage rate taken during a test at another time period. Further, in some embodiments, the first and second data points can be compared to first and second data points taken during a test at another time period.

The leakage rate computing device includes memory and, in various embodiments, the received data is stored in memory. The status of the mask can be evaluated periodically (e.g., at a set day or time of the month, whenever the mask is to enter a particular area of a building, etc.). The evaluation can be accomplished in various suitable ways. For example, in some embodiments, the evaluation can be based on multiple sets of received data from the mask to determine the status of the mask.

Another suitable use for the data received is to perform the evaluation based on multiple sets of received data from the mask to project a possible failure timeframe for the mask. In some embodiments, such an evaluation can be based on multiple sets of received data from the mask and at least one data set from another mask to project a possible failure timeframe for the mask.

FIG. 3 illustrates a front and back side of a mask seal sensor structure according to an embodiment of the present disclosure. The embodiment of FIG. 3 includes an circuit 310 with a number of components thereon including an IC 334 that is a microcontroller (or other computing device controller) that can provide power to the pressure sensor 336 (an IC that senses pressure and provides pressure data), and communicates with the pressure sensor to request and/or receive pressure measurements.

The back side of the circuit 310, shows a coiled antenna 338 around the perimeter. The coiled antenna can be used to harvest power from other nearby devices and/or transmit and/or receive data with another device such as the mask reader 230 and/or the computing device 220. Any suitable type or orientation of antenna can be used with respect to the embodiments of the present disclosure wherein the antenna can send and/or receive data and/or instructions from a remote device.

In some embodiments, these IC's and other components can be powered by a power source located on the mask (e.g., on the IC or connected thereto). However, as indicated above, in some embodiments, the sensor can function such that a power source may be optional. That is, the sensor and IC can harvest power from a mask identification reader that is not part of the mask (e.g., via antenna 338).

Harvesting power from the mask identification reader (mask reader 230) can, for example, include a user approaching and/or holding the test system for the mask seal test (e.g., testing for a leak), such that the mask identification reader may be close enough to provide adequate power for a sensing tag (e.g., pressure sensor or a combined function circuit, such as circuit 310). The mask identification reader can power the sensor, which can communicate the information to a test functionality (e.g., executable instructions on a computing device, mask reader, or mask).

The mask identification reader can charge a capacitor over time for energy storage. In some embodiments, a comparator and load switch can also be added so that the pressure sensor can be disconnected while the capacitor charges. In some embodiments, a large 1000 microFarad capacitor can be used for testing to allow more flexibility in tag position relative to the reader. The reader can charge the capacitor such that the pressure sensor voltage remains constant throughout, and although the value is large, the capacitor may be charged in less than a second, in some embodiments.

In various embodiments, a smaller capacitor, or in some instances, no capacitor, may be used in a production system. In such an instance, the reader can couple adequate power from a power source and into the sensor tag to provide a stable voltage to the pressure sensor throughout the test.

With regard to identification of the mask, in some embodiments, a sensing tag can be used that can include a unique identifier that may be connected to the respirator and/or specific to the user for test result tracking. That is, each sensor and/or sensing tag can include a unique identifier so that the tag can identify a particular mask associated with a user.

For example, each mask can have a different unique identifier and the identifiers can be used to identify one mask from another. In some embodiments, the functionality of a sensing tag can be provided by data stored in the IC 334 or sensor 336 and transmitted via the antenna 338 to a remote device that is requesting the information.

In some embodiments, when the mask seal test begins (e.g., testing for a leak), the sensor can measure and/or communicate pressure values to an external test system (e.g. a computing device 222 and/or reader 230). The pressure values can include measured vacuum decay values, in which the vacuum decay values indicate air filtering into the mask and/or a leak associated with the mask. One such example, shown as a graphical representation, is provided in FIG. 4.

Figure 4:
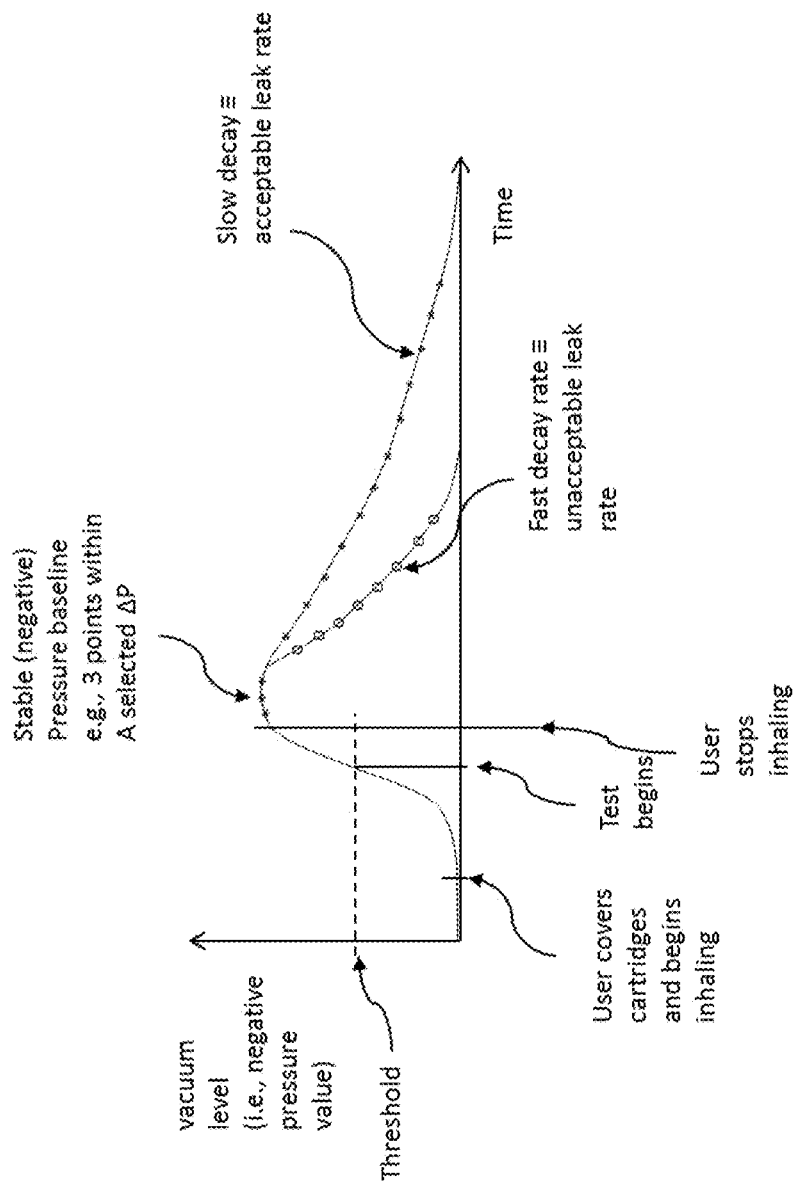
FIG. 4 provides a graph showing acceptable and unacceptable leak conditions according to embodiments of the present disclosure.

FIG. 4 provides a graph showing acceptable and unacceptable leak conditions according to embodiments of the present disclosure. FIG. 4, discusses steps involved in one embodiment of the present disclosure such as the user covering the cartridges and beginning to inhale and the user stopping inhaling. As the reader understands, the process of testing may differ from that described in FIG. 4 according to other embodiments of the present disclosure.

As may be understood from the graph of FIG. 4, as the vacuum level decays, the rate of vacuum decay can indicate a severity of a leak within the mask. For instance, a high rate of vacuum decay can be correlated with a severe leak within the mask. Alternatively, a low rate of vacuum decay can indicate a minor leak within the mask.

The external test system (e.g., computing device 222 and/or mask reader 230) or a computing device within the mask can record the vacuum decay value among other pressure values within the mask (e.g., peak vacuum level, average vacuum decay value, etc.). The vacuum decay values can indicate the rate of mask leakage.

That is, the slope of the vacuum decay may be calculated in some instances to determine a rate of vacuum decay. In some embodiments, the external test system can track the increased vacuum decay value associated with the mask.

Additionally, or alternatively, an external test system can track the decay of the vacuum as air leaks into the mask. If the decay of vacuum is a high (e.g., increased) rate, the mask seal can be deemed a failure.

A failure can indicate that the mask seal is unsafe, unacceptable, and/or outside of a decay of vacuum threshold rate. That is, a failure indicates the mask seal is not properly sealed to protect a user from outside elements (e.g., contaminated air). In some embodiments, the test system can inform the user of the failure via an alert signal. The alert signal can be any stimulus that will get the attention of the user. Examples include audible, visual, tactile or other stimulus types.

In some embodiments, a test system reader can be an Internet-connected reader, such as a mask identification reader connected to a computing device, via a wired or wireless connection (e.g., universal serial bus (USB)) or a smartphone mask identification reader using, for example, built in NFC communication technology. The user (e.g., wearer) can approach the reader and once the reader is able to receive a signal from the sensor, it can indicate to the user to begin the respirator seal test (e.g., leak test).

in one embodiment of a test procedure, the user can block the air inlets (e.g., a respirator cartridge) and inhale (e.g., breathes in) to drop the pressure (e.g., creates a partial vacuum within the mask) below a threshold pressure level. In such embodiments, once the pressure achieves the threshold pressure level, the mask seal test can begin.

The test system can monitor the pressure until it reaches a stable vacuum level baseline, indicating that the user has stopped inhaling. A stable vacuum baseline can, for example, be a series of points that indicate an acceptable level of vacuum decay over a period of time. That is, the stable vacuum level can be used as a baseline to determine the rate of vacuum decay. The rate of vacuum decay can be calculated and compared among multiple mask seal tests (of the same mask or of different masks where the data of those tests is stored in memory), to determine whether the results of each test are within an acceptable vacuum decay range.

The sensors can detect the vacuum decay within the mask, which can determine whether a seal is within a safety threshold. As used herein, a safety threshold can be, for example, the maximum rate of vacuum decay within a mask that may still be within a safety limitation.

That is, the safety threshold can be the maximum point at which a rate of vacuum decay is deemed acceptable for a user (e.g., wearer) to utilize the particular mask. However, this disclosure is not so limited and other thresholds may be used in some embodiments.

As masks are used in different environments with different gases, the thresholds can be different in different applications of the mask. In some embodiments, the threshold settings can be set by an administrator of the test system to ensure that the test is appropriate for the environment in which the masks are being used.

In various embodiments, the test system can track the pressures (e.g., vacuum) as it decays back toward ambient room pressure. That is, a quantity measured as being at or near ambient room pressure can be used to indicate the end of the test.

If the vacuum decay is adequately slow (e.g., below or within a vacuum rate change threshold), the test can indicate a pass. A pass indicates the vacuum decay is an acceptable rate of decay, meaning the air infiltrating into the mask indicates an acceptable seal.

The user can be notified of the passing test, and can resume wearing the mask within the work environment. Notification can include illuminating a light on the mask, vibrations, buzzers, audio message, other form of sensory notification, or a combination thereof.

Alternatively, if the vacuum decay is too fast, the test can indicate a failure. In some embodiments, the user can be notified of the failing test. The failing test indicates the mask seal may need repair or adjustment prior to the user returning to the work environment.

In some embodiments, the test data can be sent to a local or network connected (e.g., via the Internet) database of mask seal test results (e.g., leak results) for each user.

Additionally and/or alternatively, testing a mask seal can include a user testing valves (e.g., cartridges) for leaks by blocking the exhalation port and exhaling. That is, testing the mask seal can include testing positive pressure and/or a vacuum pressure. For example, a user can exhale (e.g., breathe out) while blocking the exit port, which can create positive pressure. Based on a decay reading, a leak associated with the valve may be detected.

In some embodiments, the mask identification reader can be held up to the face shield lens while the inlet ports (e.g., cartridges) are blocked. As discussed previously, the inlet ports can be blocked via a user's hands, plastic covers, and/or other types of covers.

FIG. 4 illustrates a good test result and a failing test result. As shown in FIG. 4, on the steeper sloping line, the mask seal was poor and air quickly leaked into the mask, creating a rapid vacuum decay. This is indicated by the fast decay rate shown by the steeper sloping line.

FIG. 4 also depicts a good mask seal. Air from outside the mask takes a longer period of time to leak into the mask. As shown in FIG. 4, the rate of vacuum decay is slower and in this instance is an acceptable leak rate, indicating a seal is within a threshold range after a predetermined period of time after the test began. In some embodiments, the graph can determine if the leakage is within the acceptable range.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above values and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A breathing mask apparatus, comprising:
a mask body having a gas housing portion that maintains a gas supply in proximity to at least one of a wearer's nose or mouth and wherein the gas housing portion includes a gas conduit connected thereto that allows the wearer to breathe through the mask body when placed on the head of the wearer, the mask body also having a skirt that forms a substantially air-tight seal with the face of the wearer;
a sensor for measuring a pressure within the gas housing portion over time to determine a leakage rate into the mask body between the skirt and the face of the wearer over a period of time,
wherein the leakage rate corresponds to air infiltrating into the mask body, and
wherein the leakage rate is used to determine if the leakage rate into the mask body between the skirt and the face of the wearer is below a threshold leakage rate; and
a mask identification reader associated with the mask body to receive pressure values from the sensor, and notify a user in response to an increased vacuum decay value among the pressure values received by the mask identification reader.

2. The breathing mask apparatus of claim 1, wherein the gas conduit includes one or more filters to filter incoming gas.

3. The breathing mask apparatus of claim 1, wherein the gas conduit is connected to a source of gas to receive gas from the source.

4. The breathing mask apparatus of claim 1, wherein the skirt forms a substantially air-tight seal with the face and forehead of the wearer.

5. A system for testing a breathing mask seal, comprising:
a mask with a mask body having:
a gas housing portion that maintains a gas supply in proximity to at least one of a wearer's nose and mouth and wherein the gas housing portion includes a gas conduit connected thereto that allows the wearer to breathe through the mask body when placed on the head of the wearer, the mask body also having a skirt that forms a substantially air-tight seal with the face of the wearer;
a sensor for measuring a pressure within the gas housing portion over time to determine a leakage rate over a period of time into the mask body between the skirt and the face of the wearer,
wherein the leakage rate corresponds to air infiltrating into the mask body, and
wherein the leakage rate is used to determine if the leakage rate into the mask body between the skirt and the face of the wearer is below a threshold leakage rate;
a leakage rate computing device that receives data from the sensor and evaluates the data to determine if leakage rate into the mask body is below the threshold leakage rate; and
a mask identification reader associated with the mask body to receive pressure values from the sensor, and notify a user in response to an increased vacuum decay value among the pressure values received by the mask identification reader.

6. The system of claim 5, wherein the received data includes a sensed pressure at a first point in time with a sensed pressure at a second point in time and the first and second sensed pressures are compared to determine the leakage rate and the leakage rate is compared to the threshold leakage rate.

7. The system of claim 5, wherein the received data includes a sensed pressure at a first point in time with a sensed pressure at a second point in time and the first and second sensed pressures are compared to determine the leakage rate and the leakage rate is compared to at least one other leakage rate taken during a test at another time period.

8. The system of claim 5, wherein the received data includes a sensed pressure at a first point in time with a sensed pressure at a second point in time and the first and second sensed pressures are compared to first and second sensed pressures taken during a test at another time period.

9. The system of claim 5, wherein the leakage rate computing device includes memory and wherein the received data is stored in memory and wherein a status of the mask is evaluated periodically based on multiple sets of received data from the mask to determine the status of the mask.

10. The system of claim 5, wherein the leakage rate computing device includes memory and wherein the received data is stored in memory and wherein a status of the mask is evaluated periodically based on multiple sets of received data from the mask to project a possible failure timeframe for the mask.

11. The system of claim 5, wherein the leakage rate computing device includes memory and wherein the received data is stored in memory and wherein a status of the mask is evaluated periodically based on multiple sets of received data from the mask and at least one data set from another mask to project a possible failure timeframe for the mask.

* * * * *